United States Patent
Patel et al.

(10) Patent No.: US 9,995,881 B1
(45) Date of Patent: Jun. 12, 2018

(54) TSV COMPATIBLE FIBER ARRAY COUPLER FOR SILICON PHOTONICS

(71) Applicant: Cisco Technology, Inc., San Jose, CA (US)

(72) Inventors: Vipulkumar Patel, Breinigsville, PA (US); Mittu Pannala, Breinigsville, PA (US); Steven L. Moyer, Lancaster, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/636,262

(22) Filed: Jun. 28, 2017

(51) Int. Cl.
*G02B 6/42* (2006.01)
*G02B 6/30* (2006.01)
*G02B 6/36* (2006.01)
*G02B 6/122* (2006.01)
*G02B 6/12* (2006.01)

(52) U.S. Cl.
CPC ............... *G02B 6/30* (2013.01); *G02B 6/122* (2013.01); *G02B 6/3636* (2013.01); *G02B 6/423* (2013.01); *G02B 2006/12147* (2013.01)

(58) Field of Classification Search
None
See application file for complete search history.

(56) References Cited

U.S. PATENT DOCUMENTS

| 9,274,275 | B2 | 3/2016 | Webster et al. |
| 9,651,739 | B2 | 5/2017 | Webster et al. |
| 2004/0057653 | A1* | 3/2004 | Fukuda ................ G02B 6/124 385/14 |
| 2015/0356818 | A1 | 12/2015 | Rajaraman et al. |

OTHER PUBLICATIONS

PLC Connections, "PLC-Transposer for Edge Coupling to Silicon PICs," revised Feb. 8, 2015.
researcher.watson.ibm.com "Silicon Nanophotonic Packaging," [Accessed Online Jun. 16, 2017].

* cited by examiner

Primary Examiner — Jerry Rahll
(74) Attorney, Agent, or Firm — Patterson + Sheridan, LLP

(57) ABSTRACT

Embodiments herein describe an apparatus for coupling a photonic chip with a plurality of optical fibers. In one embodiment, the apparatus comprises a first plurality of alignment features that correspond to a second plurality of alignment features associated with the photonic chip. Further, the apparatus comprises a plurality of grooves for receiving the plurality of optical fibers. In one embodiment, the apparatus comprises a plurality of waveguides for transmitting or receiving an optical signal. The plurality of waveguides is optically coupled to the photonic chip, as well as the plurality of optical fibers. In one embodiment, the plurality of waveguides is passively aligned with a second plurality of waveguides associated with the photonic chip.

17 Claims, 13 Drawing Sheets

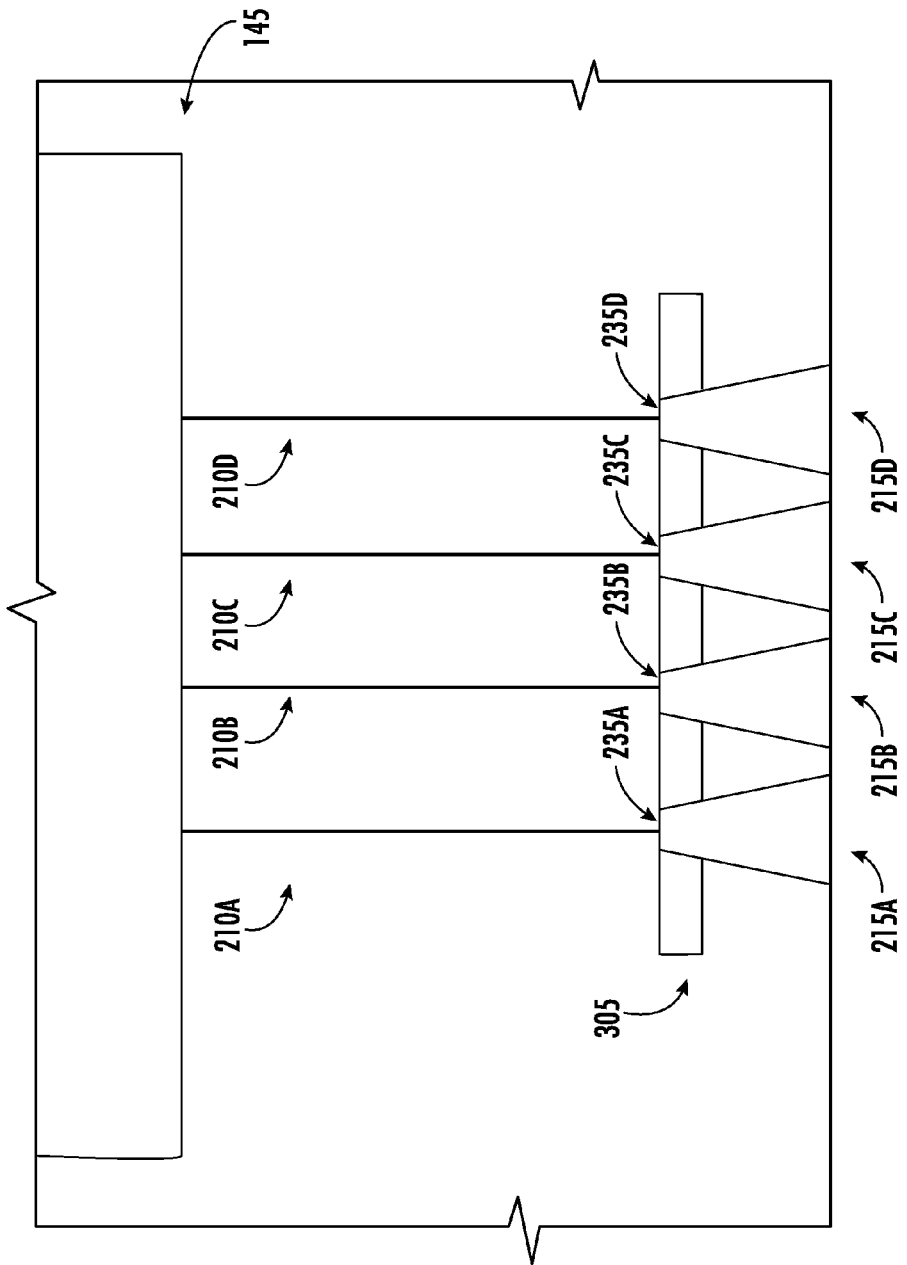

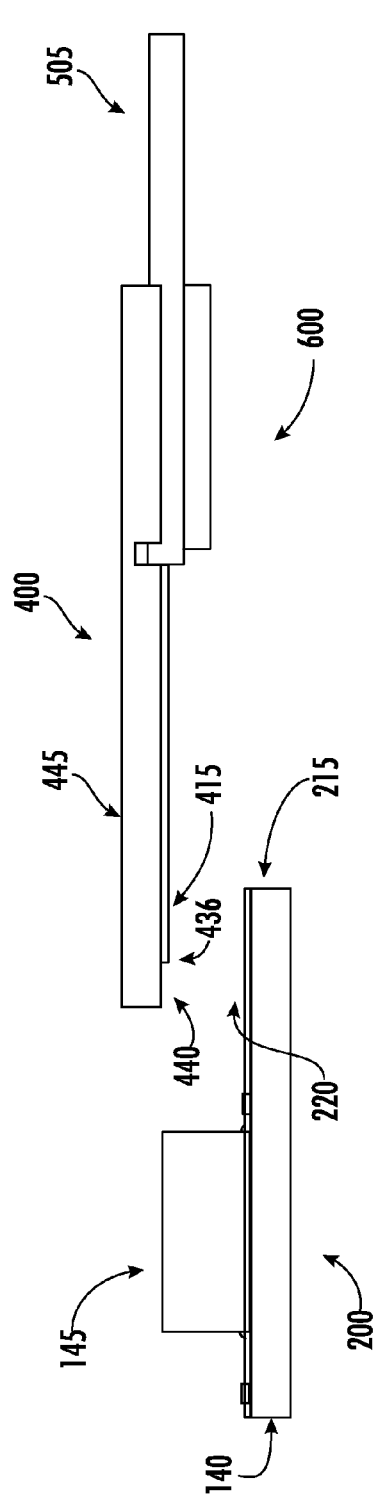
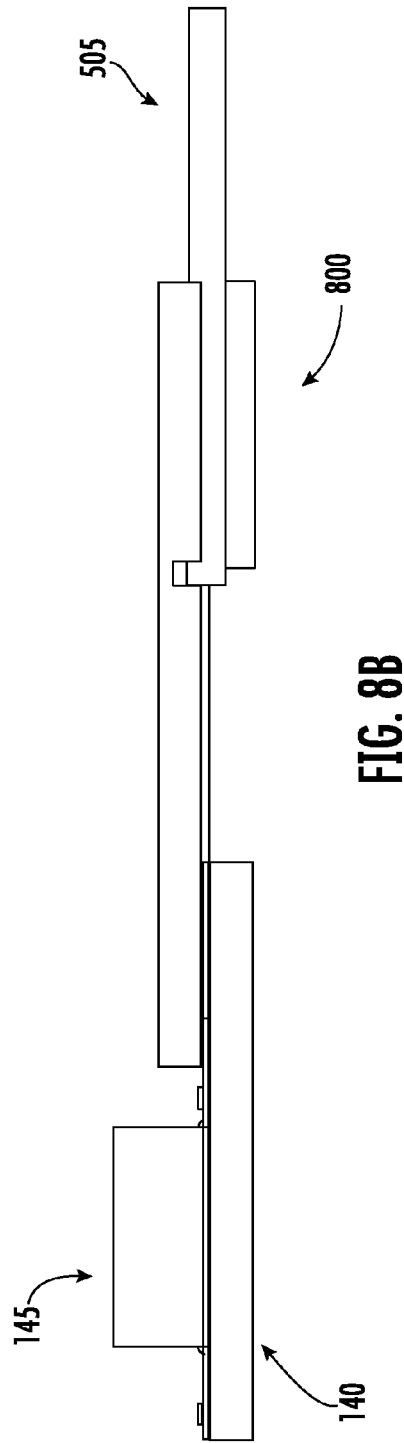

US 9,995,881 B1

TSV COMPATIBLE FIBER ARRAY COUPLER FOR SILICON PHOTONICS

TECHNICAL FIELD

Embodiments presented in this disclosure generally relate to photonic devices, and more specifically, to edge coupling with photonic devices.

BACKGROUND

Generally, photonic chips have interfaces to permit optical signals to be received from an optical source (e.g., a laser or an optical fiber) or transmitted to an optical fiber. One such method is edge coupling where the optical fiber is coupled with the edge of the photonic chip. As the level of integration, speed of operation, and functionality are increasing, photonic chips are running out of peripheral bond pad space to allow wire bond based interconnection to the underlying substrate or printed circuit board (PCB). Thus, photonic chips with Through Silicon Vias (TSVs) are highly desirable as they allow for higher density of interconnects and reduce the resistance as well as inductance associated with the wirebond connections. However, photonic chips with TSVs have several additional constraints on edge coupling. Wafers with TSVs are thinner (Typically in the range of 50 um to 150 um). Hence, even though shallow trenches in Si substrate are possible, deep trenches (typically created by Deep Reactive Ion Etching (DRIE)) cannot be created to for lens or fiber placement for an edge coupler. In addition, TSVs constrain the overall optical packaging or assembly since photonic chips with TSV must be attached to a glass or silicon interposer or a ceramic or an organic substrate using conventional solder reflow or thermal compression bonding processes. As such, conventional edge coupling techniques cannot be used with a photonic chip that has TSVs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B illustrate an alignment system, according to one embodiment herein.

FIGS. 8A-8B illustrate an alignment system and a fiber array unit, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
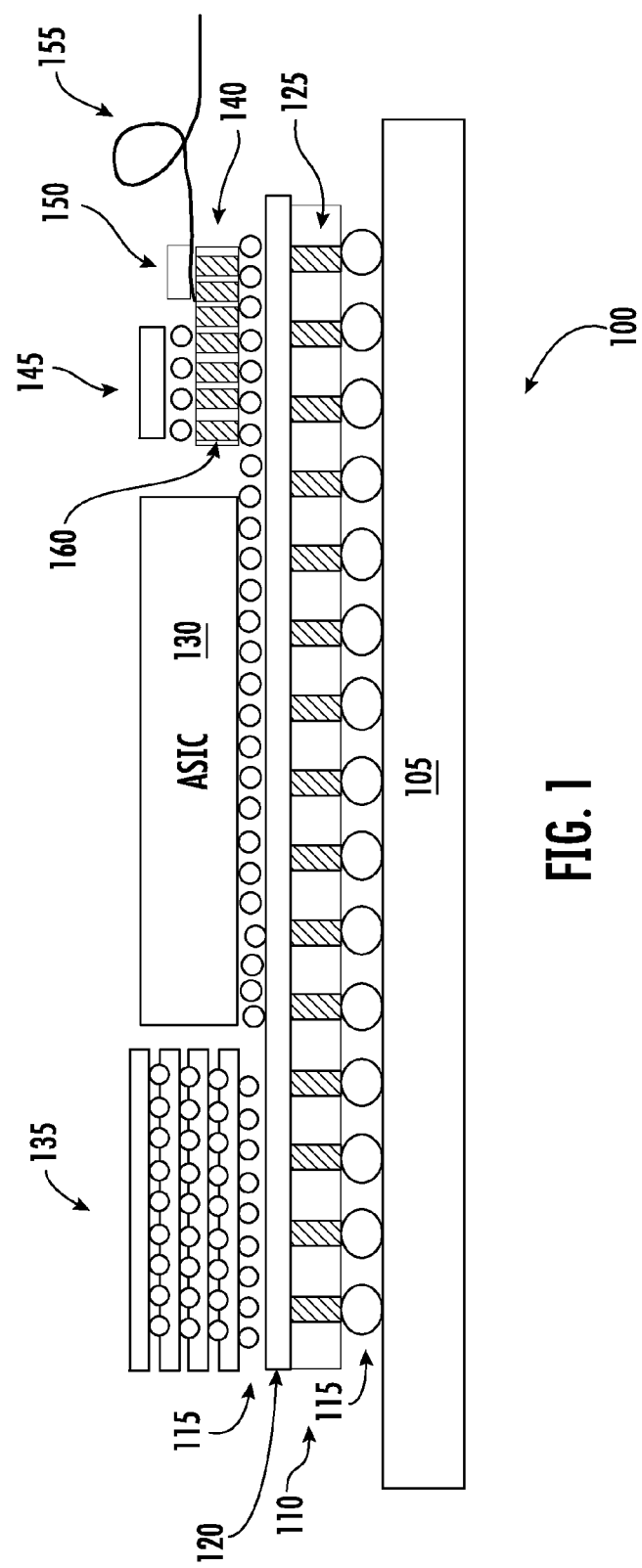
FIG. 1 illustrates an optical system, according to one embodiment disclosed herein.

One embodiment presented in this disclosure is a system that includes a photonic chip and a fiber array unit mated with the photonic chip. The photonic chip includes a first plurality of waveguides in the photonic chip having respective first ends optically coupled with an optical component of the photonic chip and respective second ends optically coupled with a first plurality of optical interfaces in the photonic chip. The photonic chip also includes a first plurality of alignment features disposed in a substrate. The fiber array unit includes a second plurality of waveguides having respective first ends optically coupled with a second plurality of optical interfaces in the fiber array unit such that the second ends of the first plurality of waveguides are optically coupled with the first ends of the second plurality of waveguides, and wherein the second plurality of waveguides have respective second ends optically coupled with a third plurality of optical interfaces in the fiber array unit. The fiber array unit also includes a second plurality of alignment features mated with the first plurality of alignment features to align the first ends of the first plurality of waveguides with the second plurality of waveguides. The fiber array unit also includes a plurality of optical fibers disposed within a plurality of grooves, wherein the plurality of grooves align the plurality of optical fibers to the third plurality of optical interfaces and the second ends of the second plurality of waveguides.

One embodiment presented in this disclosure is a fiber array unit for providing optical coupling between a photonic chip and a plurality of optical fibers. The fiber array unit includes a first plurality of waveguides configured to at least one of transmit and receive an optical signal, wherein the first plurality of waveguides have respective first ends optically coupled with a first plurality of optical interfaces and respective second ends optically coupled with a second plurality of optical interfaces. The fiber array unit also includes a plurality of grooves configured to receive and align the plurality of optical fibers to the first plurality of optical interfaces and the first ends of the first plurality of waveguides. The fiber array unit further includes a first plurality of alignment features corresponding to a second plurality of alignment features disposed in an external substrate, wherein the first plurality of alignment features and the second plurality of alignment features are arranged such that when mated the seconds ends of the first plurality of waveguides are passively aligned to a second plurality of waveguides in the external substrate.

One embodiment presented in this disclosure is a photonic chip. The photonic chip includes a first plurality of waveguides in the photonic chip having respective first ends optically coupled with an optical component of the photonic chip and respective second ends optically coupled with a first plurality of optical interfaces in the photonic chip. The photonic chip also includes a first plurality of alignment features disposed in a substrate, wherein the first plurality alignment features are configured to mate with a fiber array unit. The fiber array unit includes a second plurality of waveguides having respective first ends optically coupled with a second plurality of optical interfaces in the fiber array unit such that the second ends of the first plurality of waveguides are optically coupled with the first ends of the second plurality of waveguides, and wherein the second plurality of waveguides have respective second ends optically coupled with a third plurality of optical interfaces in the fiber array unit. The fiber array unit also includes a second plurality of alignment features mated with the first plurality of alignment features to align the first ends of the first plurality of waveguides with the second plurality of waveguides, and a plurality of optical fibers disposed within a plurality of grooves, wherein the plurality of grooves align the plurality of optical fibers to the third plurality of optical interfaces and the second ends of the second plurality of waveguides.

EXAMPLE EMBODIMENTS

Generally, photonic chips have an optical interface to transmit optical signals to an optical fiber, or to receive optical signals from an optical source such as a laser or optical fiber. Some optical interfaces include edge couplers that can be disposed at the sides of the photonic chip, which makes edge couplers easier to manufacturer and improve optical coupling compared to other solutions. The photonic chips have waveguides that carry optical signals between optical components in the chip. The waveguides allow the photonic chips to communicate with the optical interface without the photonic chips being directly adjacent to the optical interface.

In order for optical components (e.g., photonic chip, lens, laser, etc.) to function properly, the optical components need to be aligned with each other. Optical alignment is the process of aligning optical elements with one another to maximize the accuracy and performance of transmitted signals. Active alignment requires a person to view and align the different components based on feedback when transmitting optical signals between the components, which increases the cost of manufacturing photonics chips. Passive alignment (also referred to as mechanical alignment) relies on strict manufacturing tolerance of components (e.g., the substrate) and optical based initial placement to ensure the components are aligned properly when the components are placed at their respective position without the need for aligning the components based on feedback—i.e., without transmitting optical signals between the components.

Embodiments herein describe a fiber array unit configured to couple a photonic chip with a plurality of optical fibers. The fiber array unit has a plurality of grooves for receiving a plurality of optical fibers. In one embodiment, the fiber array unit has a plurality of alignment teeth that correspond to a plurality of alignment slots in a substrate of the photonic chip. In one embodiment, the fiber array unit has a plurality of waveguides for communicating an optical signal from the plurality of optical fibers to a plurality of waveguides optically coupled with the photonic chip. Thus, in this embodiment, a continuous optical connection exists from the photonic chip through the fiber array unit to the plurality of optical fibers.

FIG. 1 illustrates an optical system 100, according to one embodiment herein. As shown, the optical system 100 has a substrate 105 and an interposer layer 110 connected via solder 115. The interposer layer 110 is a layer with through electrical connections and routing layers on Silicon, Glass, Ceramic or organic material. The interposer layer 110 is coupled with a redistribution layer (RDL) 120. Coupled with the RDL 120 are an application specific integrated circuit (ASIC) 130, a high bandwidth memory (HBM) 135, and a photonic chip 140. The RDL 120 one or more layers of wiring in the optical system 100 that allows electrical connections to be made with electrical components coupled with the RDL 120. Stated differently, the RDL 120 allows components (e.g., the ASIC 130, the HBM 135, the photonic chip 140, etc.) to communicate electrically by minimizing external electrical connections. As shown, the interposer layer 110 has a plurality of Through Silicon Vias (TSVs) 125, which couple the RDL 120 to the semiconductor substrate 105. While the interposer layer 110 is shown with TSVs, the interposer layer 110 may be made of glass in which case the interposer layer 110 would be a through via or a through oxide via. In one embodiment, the TSVs 125 provide power to the RDL 120 such that the ASIC 130, the HBM 135, and the photonic chip 140 may be powered via the TSVs 125.

As shown, the photonic chip 140 is coupled with a driver 145 and a fiber coupler 150. The driver 145 sends/receives signals to/from an optical fiber 155 via the fiber coupler 150 and the photonic chip 140. In another embodiment, the driver 145 is a transimpedance amplifier that amplifies the electrical signals generated by the detector on the photonic chip 140 of the photonic signals received from the optical fiber 155 via the fiber coupler 150. As shown, the photonic chip 140 has a plurality of TSVs 160. The photonic chip 140 provides power from the Printed Circuit Board (PCB) or organic/ceramic substrate through interposer 120 to the driver 145 via the one or more TSVs 160.

In one embodiment, the ASIC 130 and the driver 145 communicate via the TSVs 160 on the photonic chip 140, as well as the interposer layer 110 and RDL 120. In one embodiment, the ASIC 130 comprises logic for providing data to and from the photonic chip 140 from outside the system 100. For example, the ASIC 130 can send signals to the driver 145 such that the driver 145 sends a signal to a modulator (not shown) in the photonic chip 140, and the modulator encodes the data from the driver 145 onto an optical signal. In one embodiment, at high speed operation, the driver 145 is placed directly onto the photonic chip 140 to provide electrical connections that are as short as possible. In one embodiment, the photonic chip 140 comprises a detector (not shown) which outputs voltages based on a received optical signal to the driver 145. The driver 145 in turn provides data to the ASIC 130 based on the received signal. In one embodiment, the HBM 135 stores settings for the ASIC 130 which dictate how the ASIC 130 communicates between the driver 145 and external devices and systems. In another embodiment, the HBM 135 stores settings for how the photonic chip 140 receives and transmits optical signals.

In one embodiment, the photonic chip 140 is a photonics transceiver that receives and transmits optical signals. For example, an optical signal may be transmitted along the optical fiber 155 to the fiber coupler 150 where the photonic chip 140 receives the optical signal. As another example, the photonic chip 140 transmits an optical signal via the fiber coupler 150 to the optical fiber 155. In this manner, the photonic chip 140 can communicate via the fiber coupler 150 and the optical fiber 155. In one embodiment, the photonic chip 140 is an optical modulator that is controlled by electrical data signals received from the driver 145. In another embodiment, the photonic chip 140 is an optical detector that transmits electrical signals to the ASIC 130 via the driver 145. Specifically, the TSVs of the photonic chip 140 and traces on the PCB or organic/ceramic substrate have an electrical signal that corresponds to an optical signal detected by the photonic chip 140. In this manner, the optical system 100 may send and/or receive optical signals.

Figure 2:
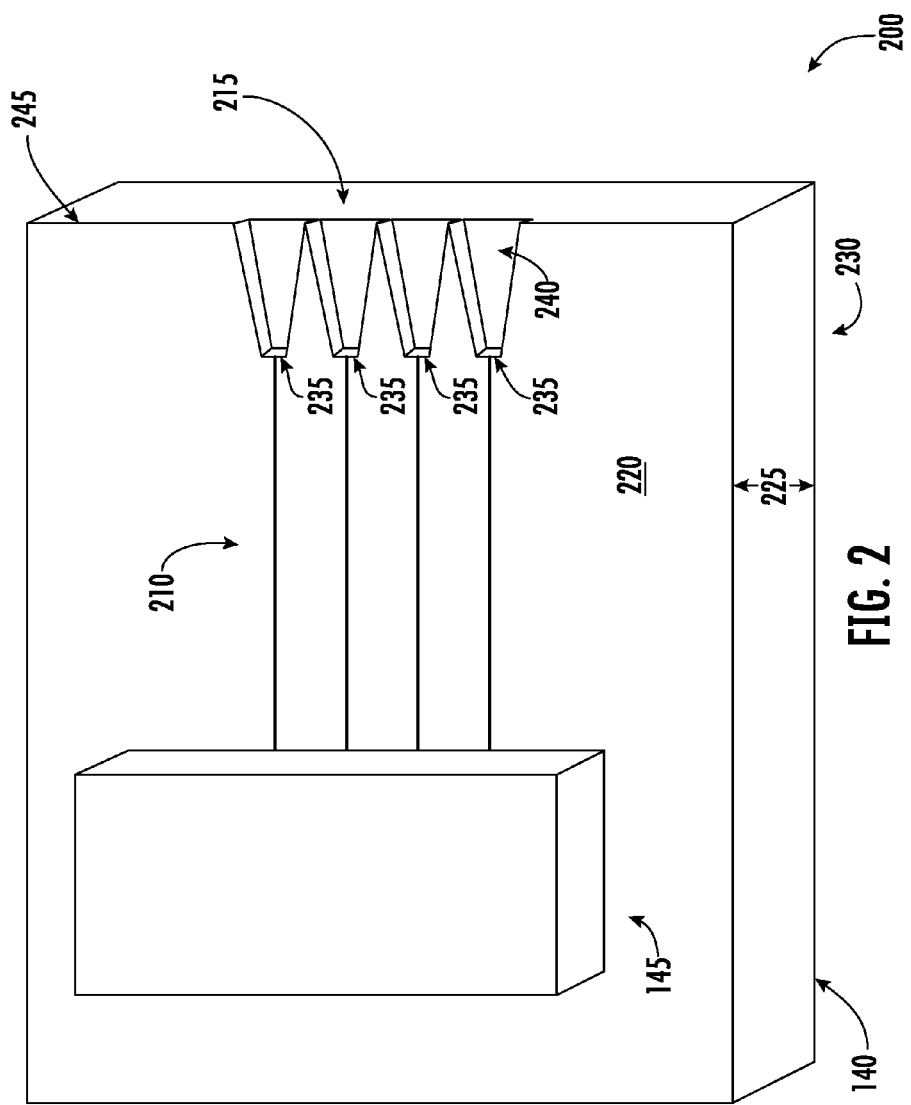
FIG. 2 illustrates an alignment system, according to one embodiment disclosed herein.

FIG. 2 illustrates an alignment system 200 having a photonic chip 140, according to one embodiment herein. In one embodiment, the photonic chip 140 has a silicon substrate. The photonic chip has a top surface 220, a height 225, and a bottom surface 230. As shown, the alignment system 200 has a driver 145, waveguides (WGs) 210, and alignment slots 215. In one embodiment, the photonic chip 140 is made from a Silicon-On-Insulator (SOI) substrate, and the waveguides 210 are made in the SOI layer. As shown, the WGs 210 extend from modulators and detectors (not shown) within the photonic chip 140 that are below the driver 145 to the alignment slots 215. The modulators and detectors receive and transmit optical signals to and from the waveguides 210. The modulators convert electrical signals from the driver 145 into optical signals that are carried by the waveguides 210. The detectors convert optical signals from the waveguides 210 into electrical signals that are provided to the driver 145. The driver 145 amplifies the received electrical signals in order to make the electrical signals compatible with additional electrical circuits (e.g., the ASIC 130 of FIG. 1). Thus, the WGs 210 optically couple the detectors and modulators within the photonic chip 140 with a respective optical interface 235 of each of the alignment slots 215. In one embodiment, the detectors and modulators send and/or receive optical signals via the WGs 210. While the WGs 210 are shown as extending to the top of the alignment slots 215, the WGs 210 may not be directly exposed at the optical interfaces 235 in the alignments slots 215. Rather, in one embodiment, the WGs 210 are optically connected with the optical interfaces 235, but the WGs 210 are recessed from the optical interface 235 of the alignment slots 215. That is, the WGs 210 terminate before reaching the top of the alignment slots 215. In that case, dielectric material is present between the termination of the WGs 210 and the optical interface 235 of the alignment slots 215. In one embodiment, the WGs 210 are fabricated in a silicon layer of the photonic chip 140.

As shown, the alignment slots 215 are etched in the interlayer dielectric layers within the photonic chip 140. In one embodiment, some depth of silicon substrate is also etched. The alignment slots 215 each have a bottom surface 240. The alignment slots 215 extend from the optical interfaces 235 to an edge 245 of the photonic chip 140. In one embodiment, the alignment slots 215 are etched from the top surface 220 of the photonic chip 140 to a depth within the photonic chip 140 without etching through to the bottom surface 230 of the photonic chip 140. The alignment slots 215 are designed to couple with alignment teeth of a fiber array unit (FAU) (not shown) which will be described further with regards to FIGS. 4-6. The alignment slots 215 allow the FAU to be optically coupled with the WGs 210 in a passive manner—i.e., without active alignment.

As shown, the alignment slots 215 are trapezoidal in shape. The top of the trapezoid is located at the optical interface 235 with the sides of the trapezoid extending from the optical interface 235 towards the edge 245 of the photonic chip 140. Further, the trapezoidal shape of the alignment slots 215 results in the separation distance of the sides decreasing as the sides approach the optical interface 235, which forces the FAU to align with the optical interface 235. Therefore, the trapezoidal shape simplifies the process of mating the photonic chip 140 with the FAU. Thus, a recess is created within the photonic chip 140 by the alignment slots 215, which provides a volume for mating the photonic chip 140 with the FAU.

In one embodiment, each of the alignment slots 215 are etched to the same depth in the photonic chip 140. In another embodiment, the alignment slots 215 are etched to varying depths within the photonic chip 140. While the alignments slots 215 are shown as trapezoidal for ease of explanation, a person skilled in the art will appreciate that any shape may be used. Further, while the alignment slots 215 are shown as having the same shape for ease of explanation, a person skilled in the art would appreciate that the alignment slots 215 may vary in shape from one slot to the next. In one embodiment, the alignment slots 215 are rectangular in shape having parallel sides with one base being the optical interface 235 and the other base being the edge 245 of the photonic chip 140.

Figure 3B:
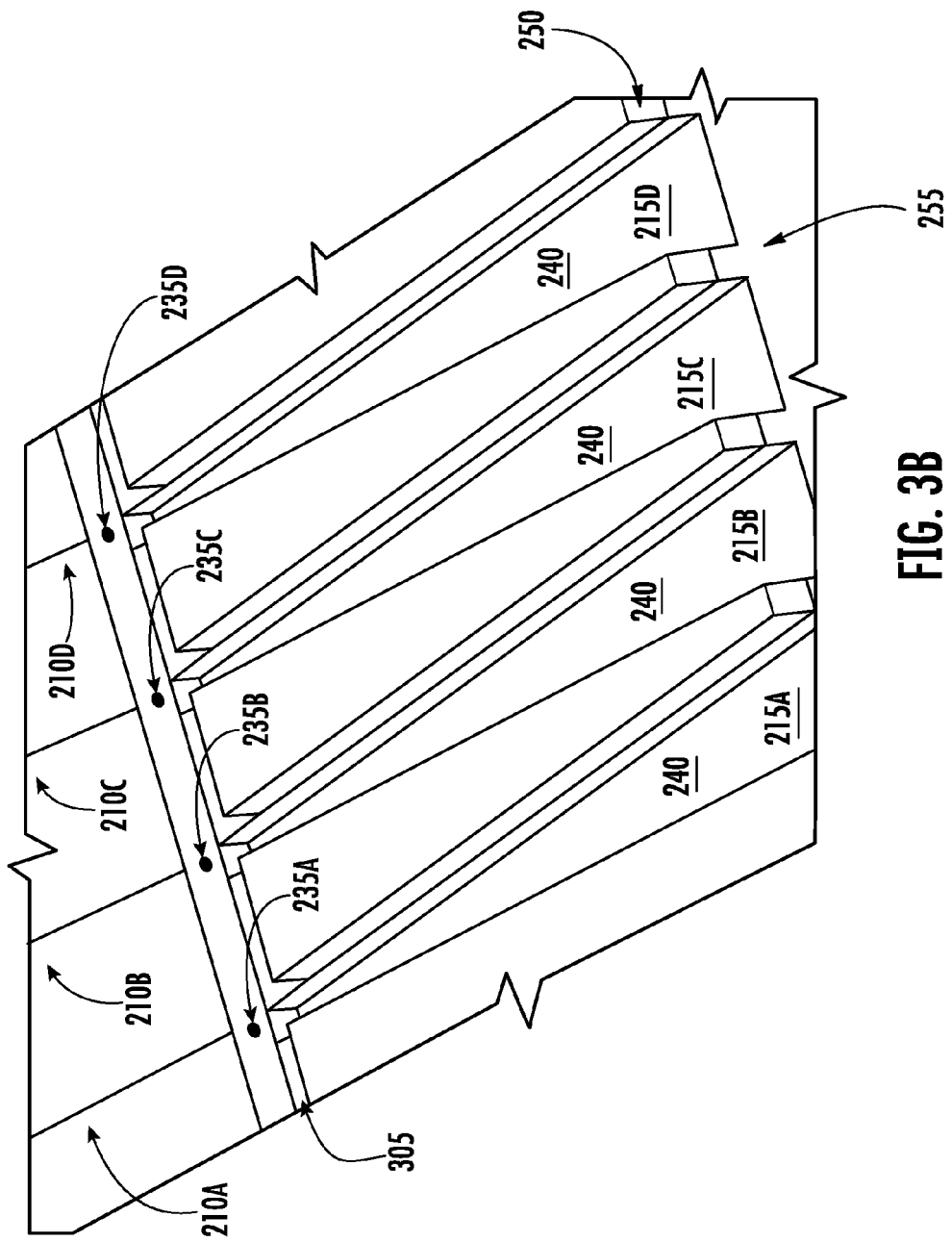

FIGS. 3A-3B illustrate the alignment slots 215, according to one embodiment herein. FIG. 3A illustrates a top view of the photonic chip 140 and the driver 145 with the WGs 210A, 210B, 210C and 210D, which in turn are coupled with the optical interfaces 235A, 235B, 235C, and 235D. Each of the WGs 210 are also associated with a respective alignment slot 215 (e.g., WG 210A is associated with the alignment slot 215A, WG 210B is associated with the alignment slot 215B, etc.). A channel 305 is shown at the optical interfaces 235 where the WGs 210 abut the alignment slots 215. In one embodiment, the channel 305 captures any excess epoxy when the FAU (not shown) is mated within the alignment slots 215. While four WGs and four alignment slots are used for ease of explanation, a person skilled in the art will appreciate that any number of WGs and alignment slots maybe used (e.g., 1, 10, 100, 1000, etc.), and the present disclosure should not be limited to the embodiment shown.

FIG. 3B illustrates an isometric view of the alignments slots 215. As shown, the WGs 210 are embedded within the photonic chip 140 and extend to the optical interfaces 235. As shown, the channel 305 is etched to a first depth below the top surface 220 of the photonic chip 140. Specifically, the alignment slots 215 are etched to a second depth below the first depth of the channel 305. In one embodiment, the channel 305 is etched through an interlayer dielectric (ILD) 250 to the top of a substrate 255 of the photonic chip 140. Further, the alignment slots 215 are etched through the ILD 250 and into the substrate 255. Stated differently, the alignment slots 215 are etched further from the top surface 220 than the channel 305. In one embodiment, the depth of the alignment slots 215 is dependent on the depth of a cladding layer of the FAU. In one embodiment, the edge coupling facet for the WGS 235 is created by plasma etching of the cladding layer with precise dimensional control. In one embodiment, the depth of the channel 305 and the alignment slots 215 are the same. While the depth of the alignment slots 215 is shown as approximately double the depth of the channel 305 for ease of explanation, a person skilled in the art will appreciate that the depth of the alignment slots 215 are not dictated by the depth of the channel 305, and vice versa.

The channel 305 creates a void between the termination of the optical interfaces 235 and the rest of the layer. As will be explained in more detail below with regards to FIG. 7-8, the alignment slots 215 are coupled with the FAU. In one embodiment, an epoxy (not shown) physically mates the alignment slots 215 with the FAU. In one embodiment, the epoxy fills gaps between the WG termination point at the optical interfaces 235 to prevent any gaps between the optical connection of the FAU and the WGs, as well as attach (e.g., glue, connect, etc.) the FAU to the photonic chip 140. The channel 305 provides a recess for excess epoxy (not shown) to flow so that the excess epoxy does not interfere with the mating of the alignment slots 215 and the FAU. In one embodiment, additional secondary channels (not shown) are connected to the channel 305 to allow the index matching epoxy to flow. As will be appreciated by one skilled in the art, the channel 305 is not necessary for the alignment slots 215 to mate. In one embodiment, an optical coupler is disposed in the photonic chip 140 at the termination of the WGs 210. That is, the optical coupler may be disposed between the WGs 210 and the optical interface 235 for changing the mode size of the optical signal as it propagates between the WGs 210 and the FAU.

Figure 4:
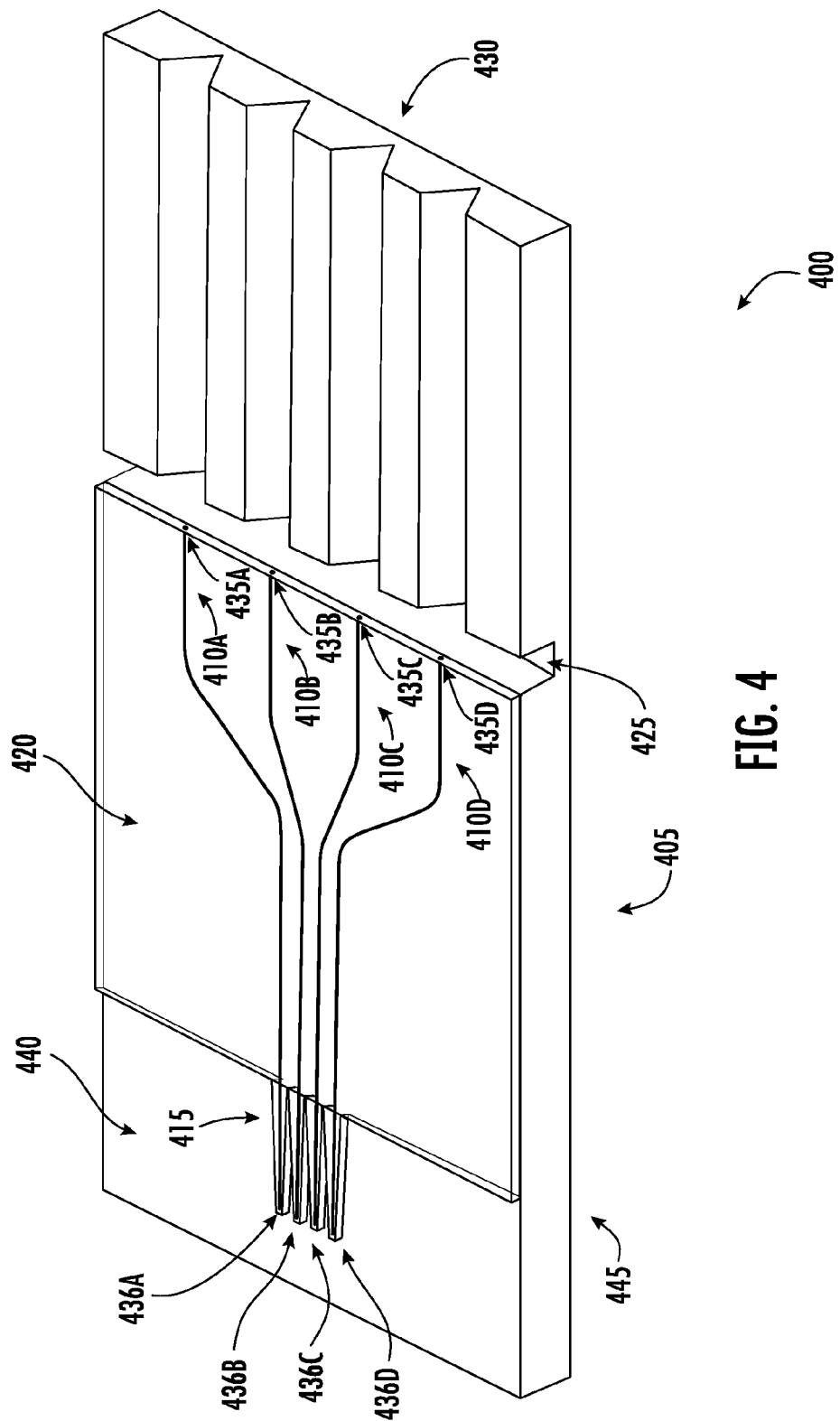
FIGS. 4-6 illustrate a fiber array unit, according to one embodiment disclosed herein.

FIG. 4 illustrates a FAU 400, according to one embodiment herein. The FAU 400 has a substrate 405 having four grooves 430 for holding optical fibers (not shown). The substrate 405 has a top surface 440 and a bottom surface 445. The FAU 400 also has a fiber termination slot 425 for dictating where the optical fibers terminate when placed in the grooves 430. The FAU 400 has a cladding 420 having a plurality of WGs 410 formed therein. In one embodiment, the cladding 420 is a semiconductor material placed on top of the substrate 405. In another embodiment, the cladding 420 is a portion of the substrate 405. In one embodiment, the cladding 420 is a lower index material than the WGs 410. For example, the WGs 410 may be silicon dioxide (SiO2), silicon nitride, or any other higher index material with respect to the cladding.

As shown, the FAU 400 has a plurality of alignment teeth 415. In one embodiment, the alignment teeth 415 are etched out of the cladding 420 to reveal a top surface 440 of the substrate 405. The alignment teeth 415 correlate to the alignment slots 215 of FIG. 3B. That is, in one embodiment the alignment teeth 415 have approximately the same (or slightly smaller) height, width, and depth as the alignment slots 215. Thus, when the alignment teeth 415 are mated with the alignment slots 215, the alignment teeth 415 fit within the volume defined by the alignment slots 215.

The FAU 400 has four grooves 430. As shown, the grooves 430 have a primarily V shape to receive an optical fiber. In one embodiment, the dimensions of the grooves 430 are dictated by the size of the optical fiber. For example, the grooves 430 may have a height and depth such that when an optical fiber is placed within the groove, the center of the optical fiber is optically aligned with the four WGs 410, which will be described in further detail below. While the grooves 430 are illustrated as having a primarily V shape, a person skilled in the art would appreciate the grooves 430 may be any shape, such as U shaped as described with reference to FIG. 12, as long as an optical fiber can be placed within the grooves 430. Further, while the FAU 400 is illustrated with four groves 430 for simplicity, a person skilled in the art would appreciate the FAU 400 may have any number of grooves 430 (e.g., 1, 10, 50, 1000, etc.) and waveguides.

The FAU 400 has four WGs 410. In one embodiment, each of the alignment teeth 415 has a respective WG 410 associated with each of the alignment teeth 415, as well as each of the grooves 430 have a respective WG 410 associated with each of the grooves 430. As shown, the WGs 410 begin at a respective optical interface 436 associated with the alignment teeth 415 and terminate at an optical interface 435 associated with the grooves 430. That is, WG 410A begins at optical interface 436A, WG 410B begins at optical interface 436B, and so forth. Thus, the WGs 410 create an optical link between the interfaces 435 and 436. While the WGs 410 are shown as extending to the end of the alignment teeth 415 and to the fiber termination slot 425, the WGs 410 may not be directly exposed at the optical interfaces 435 and 436. Rather, in one embodiment, the WGs 410 are optically connected with the optical interfaces 435 and 436, but the WGs 410 are recessed from the end of the alignment teeth 415, as well as the fiber termination slot 425. That is, the WGs 410 terminate before reaching the end of the alignment teeth 415 and the fiber termination slot 425. In that case, dielectric material is present between the termination of the WGs 410 and the optical interfaces 435 and 436. In one embodiment, an optical coupler is disposed in the cladding 420 at the termination of the WGs 410. That is, the optical coupler may be disposed between the WGs 410 and the optical interfaces 435 and 436 for changing the mode size of the optical signal as it propagates between the WGs 410, the optical fibers, and the photonic chip 140.

As shown, the WGs 410 fan out from the alignment teeth 415 towards the four grooves 430 and terminate at the respective optical interface 435 adjacent to the fiber termination slot 425. Thus, the WGs 410 are close together near alignment teeth 415, but as the WGs 410 progress towards the fiber termination slot 425, the WGs 410 fan out. In another embodiment, the WGs 410 are in a straight line from the alignment teeth 415 to the fiber termination slot 425.

In a further embodiment, the WGs 410 correlate with the WGs 210 of FIG. 2. That is, when the alignment teeth 415 of the FAU 400 are placed within the alignment slots 215, the WGs 410 are optically aligned with the WGs 210. Specifically, in this embodiment, the optical interface 235 associated with the WGs 210 is optically coupled with a respective optical interface 436 associated with the WG 410s. Thus, the WG 210A is optically aligned with the WG 410A, the WG 210B is aligned with the WG 410b, and so forth. In this manner, the WGs 410 are optically coupled with the WGs 210 via the optical interfaces 235 and 436 when the FAU 400 and the alignment system 200 are mated, as will be described in further detail with regards to FIGS. 7-8. While the FAU 400 is illustrated with four WGs 410 for simplicity, a person skilled in the art would appreciate the FAU 400 may have any number of WGs 410 (e.g., 1, 10, 50, 1000, etc.).

Figure 5:
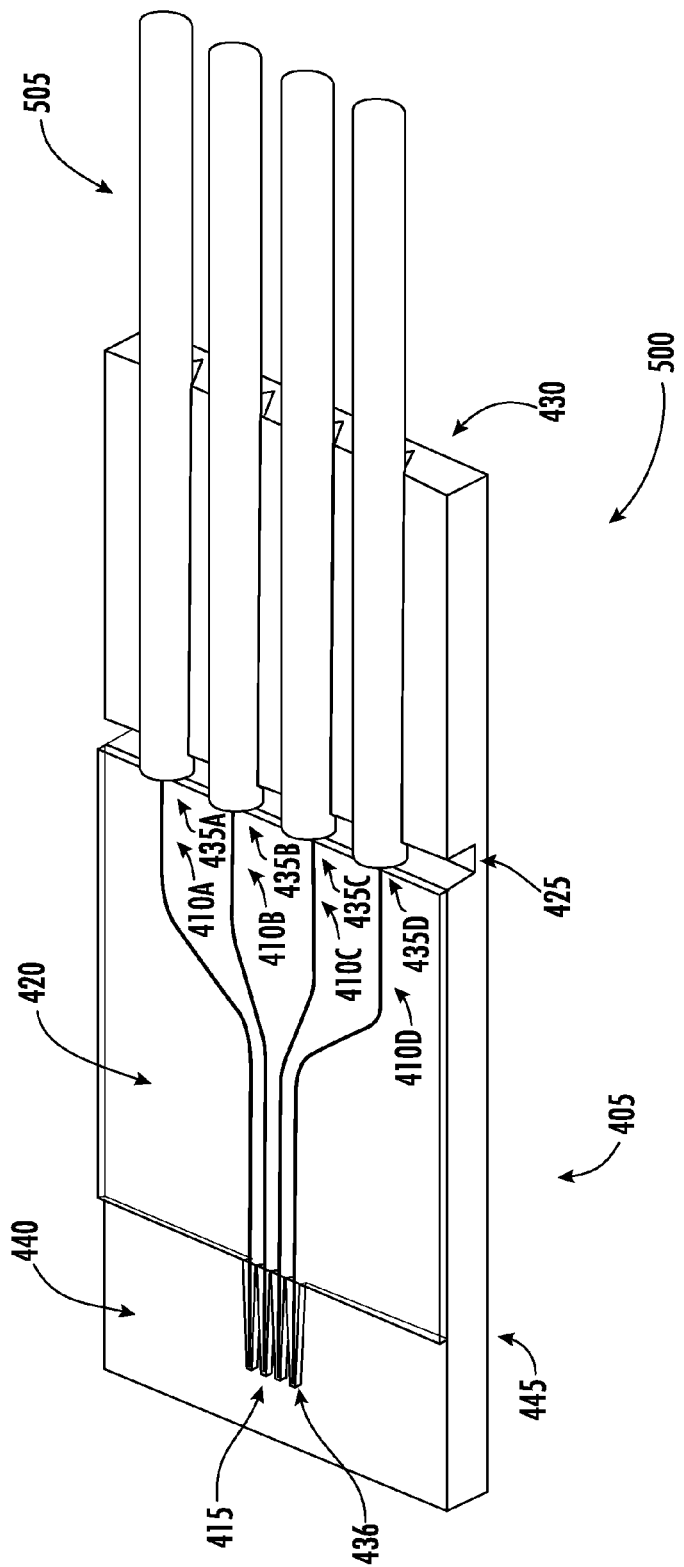

FIG. 5 illustrates an FAU 500, according to one embodiment herein. The FAU 500 is the same as FAU 400 except that four optical fibers 505 are placed within the grooves 430. In one embodiment, the grooves 430 are created in the substrate 405 based on the dimensions of the optical fibers 505. As mentioned above, the dimensions of the grooves 430 can be controlled such that placing the optical fibers 505 within the grooves 430 aligns the optical fibers 505 with the optical interfaces 435. Thus, there is no need for active alignment of the optical fibers 505 as the grooves 430 passively align the optical fibers 505 with the optical interfaces 435. In one embodiment, the optical interfaces 435 are aligned with an approximate center of the optical fibers. In a further embodiment, the optical interfaces 435 are mode matched with the optical fibers 505.

As shown, the optical fibers 505 are placed within the grooves 430 such that the optical fibers 505 are mated with the fiber termination slot 425. As explained above, the optical interfaces 435 terminate at the fiber termination slot 425. Thus, the optical fibers 505 are optically coupled with the optical interfaces 435. Therefore, in this embodiment, the optical interface 436 is optically coupled with the optical fibers 505 because the WGs 410 terminate at the optical interface 435, which is optically coupled with the optical fibers 505. Thus, a continuous optical connection is created from the optical interfaces 436 of the alignment teeth 415 through the WGs 410 to the optical interfaces 435 and continues to the optical fibers 505.

In one embodiment, the optical fibers 505 are flush against the fiber termination slot 425 and the optical interfaces 435. In one embodiment, an index matching epoxy (not shown) is placed between the optical fibers 505 and the fiber termination slot 425 to create a continuous physical connection between the optical fibers 505 and the optical interfaces 435. The index epoxy prevents dust or other particles interfering with the optical connection between the optical interfaces 435 and the optical fibers 505. It also avoids air/glass interfaces and improves coupling efficiency and tolerances. In one embodiment, the fiber termination slot 425 captures excess epoxy (not shown) placed between the optical fibers 505 and the optical interfaces 435.

Figure 6:
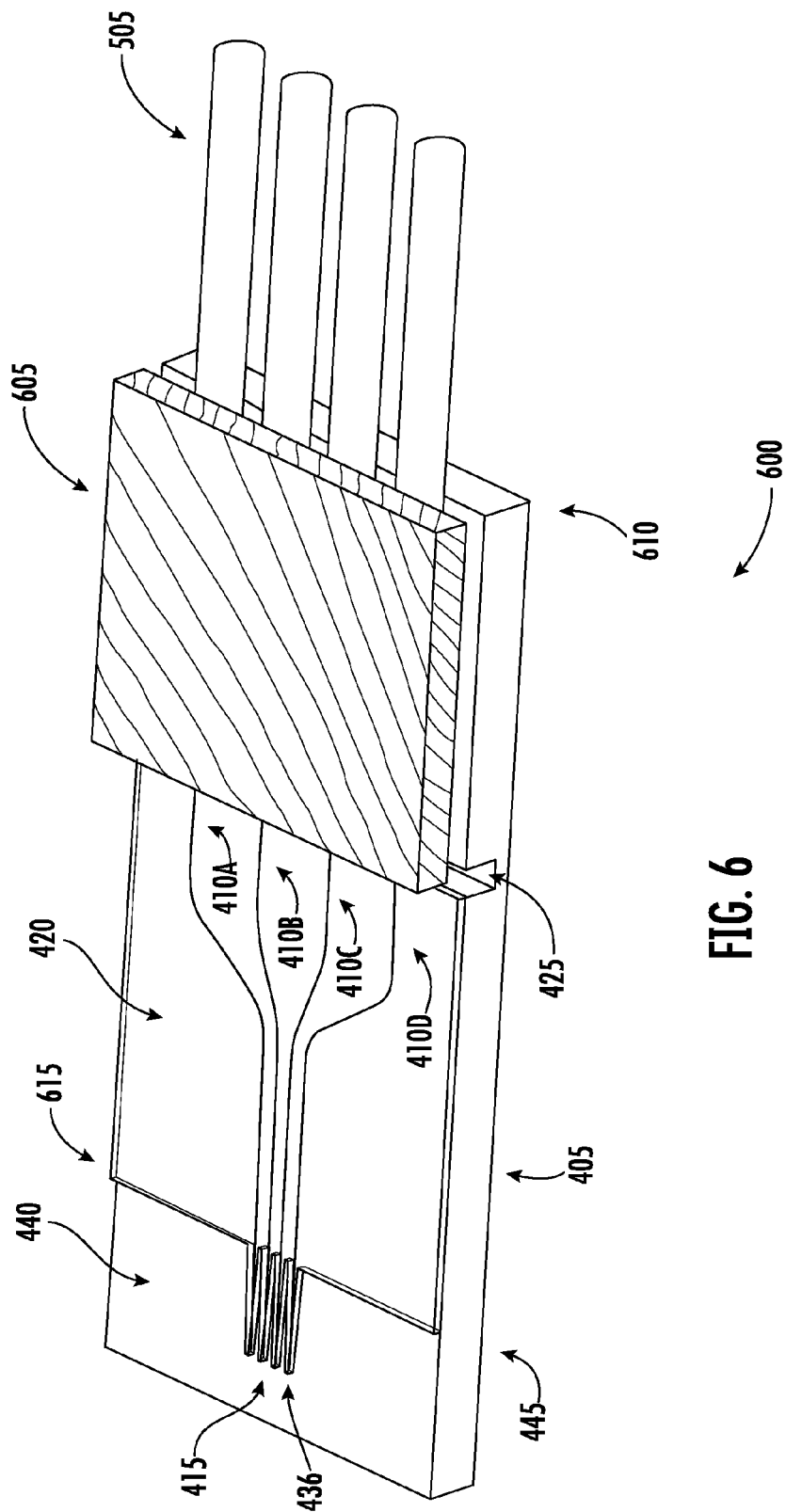

FIG. 6 illustrates an FAU 600, according to one embodiment herein. The FAU 600 is the same as FAU 500 except that a fiber holding plate 605 is added. The fiber holding plate 605 is placed on top of the optical fibers 505 to hold the optical fibers 505 in place. Stated differently, the fiber holding plate 605 prevents the optical fibers 505 from shifting. As shown, the fiber holding plate 605 extends from the edge 610 of the substrate 405 to the fiber termination slot 425. In one embodiment, the fiber holding plate 605 extends from the edge 610 of substrate 405 to the edge 615 of the cladding 420. Thus, as would be appreciated by one skilled in the art, the fiber holding plate 605 may be any size or shape as long as the fiber holding plate 605 helps secure the optical fibers 505 and should not be limited to examples provided.

In one embodiment, an epoxy (not shown) is placed on the fiber holding plate 605 to attach the fiber holding plate 605 to the substrate 405. Thus, the optical fibers 505 are secured between the fiber holding plate 605 and the substrate 405. In one embodiment, the fiber termination slot 425 captures any excess epoxy (not shown) placed on the fiber holding plate. While an epoxy has been described for simplicity, a person skilled in the art would appreciate any suitable adhesive may hold the fiber holding plate 605 in place. In one embodiment, the fiber holding plate 605 is made from a semiconductor material or glass.

Figure 7:
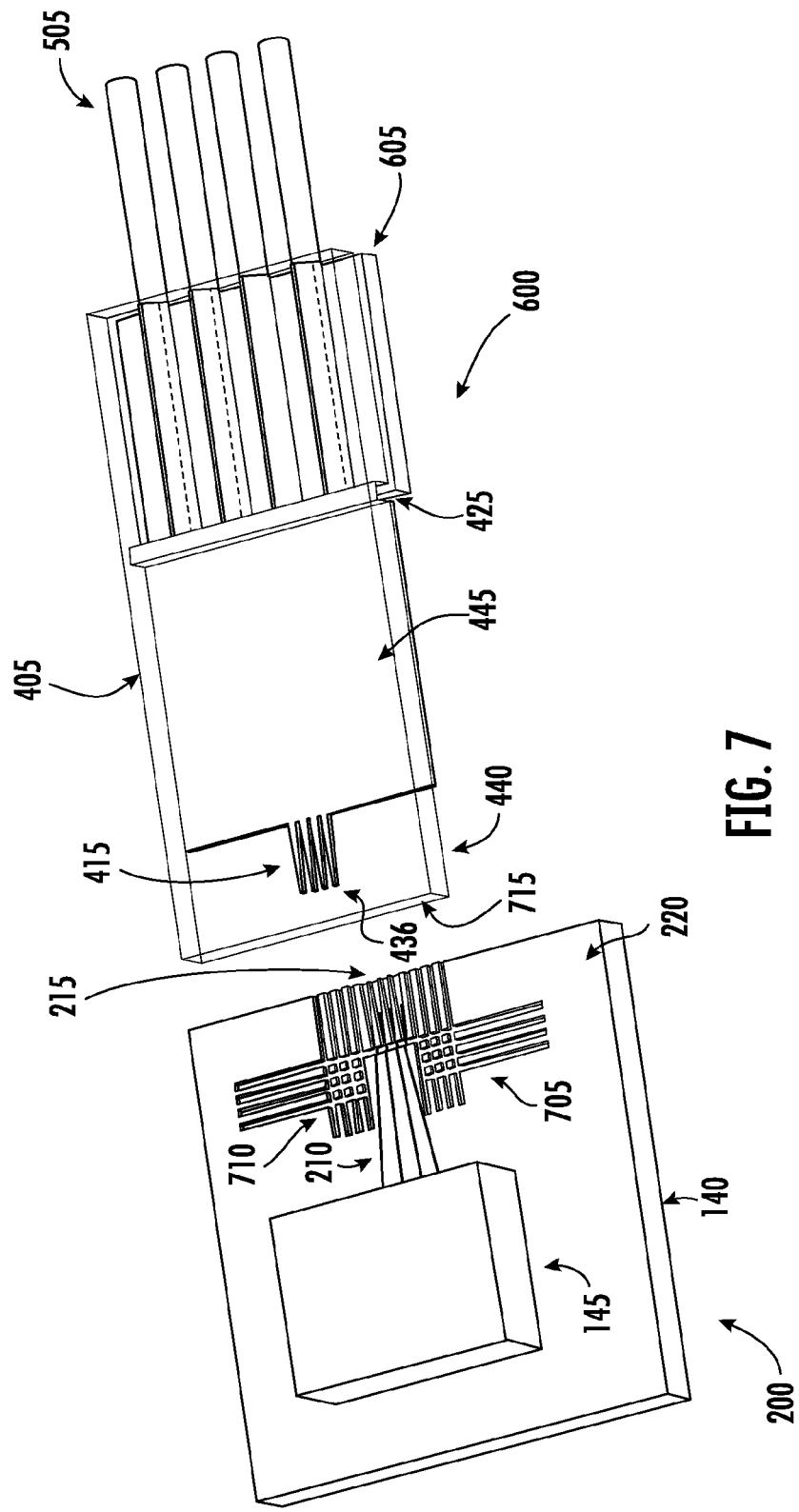
FIG. 7 illustrates an alignment system and a fiber array unit, according to one embodiment disclosed herein.

FIG. 7 illustrates the alignment system 200 and the FAU 600, according to one embodiment herein. As shown, the FAU 600 is illustrated with the substrate 405 being see through. The FAU 600 has been flipped over such that the top surface 440 of the substrate 405 is now facing downwards and the bottom surface 445 of the substrate 405 is now facing upwards. Thus, the alignment teeth 415 and the optical interfaces 436 are facing downwards towards the alignment system 200. While the alignment slots 215 are shown as being on the alignment system 200 and the alignment teeth 415 are shown as being on the FAU 600 for ease of explanation, a person skilled in the art would appreciate the alignment teeth may be located on the alignment system 200 and the alignment slots may be located on the FAU 600.

The photonic chip 140 has epoxy channels 705 and 710 added to either side of the alignment slots 215. As shown, the epoxy channels 705 and 710 comprise a plurality of slots etched into the photonic chip 140 to receive an epoxy (not shown) to couple the alignment system 200 with the FAU 600. In one embodiment, the height and width of the epoxy channels 705 and 710 correlates to the width of the substrate 405, and the distance from the cladding 420 (not shown) to the edge 715 of the substrate 405. Stated differently, when the alignment system 200 is coupled with the FAU 600, the epoxy channels 705 and 710 are completely covered by the substrate 405. As will be appreciated by one skilled in the art, the epoxy channels 705 and 710 may be larger or smaller depending on the application. For example, the epoxy channels 705 and 710 may be larger than the dimensions of the substrate 405 to hold additional epoxy. In one embodiment, the epoxy channels 705 and 710 are etched to the same depth as the channel 305 described with regards to FIG. 3. In another embodiment, the epoxy channels 705 and 710 are etched to a different depth than the channel 305.

FIG. 8A illustrates the alignment system 200 and the FAU 600, according to one embodiment herein. Specifically, the FAU 600 is positioned above the alignment system 200 such that the bottom surface 440 of the FAU 600 is facing the top surface 220 of the alignment system 200. As shown, the alignment teeth 415 are directly over the alignment slots 215. Thus, the FAU 600 is in position to mate with the alignment system 200.

FIG. 8B illustrates a photonic system 800, according to one embodiment herein. The photonic system 800 comprises the alignment system 200 mated with the fiber array unit 600. In this embodiment, the alignment slots 215 (not shown) are mated together with the alignment slots 415 (not shown) to passively align the WGs 210 and 410 (not shown). Thus, the photonic system 800 creates a single continuous optical connection from the driver 145 on the photonic chip 140 to the optical fibers 505. The mating of the alignment system 200 and the fiber array unit 600 is dictated by the alignment slots 215 and alignment teeth 415 which are made by semiconductor lithography and etch processes with very tight tolerances. In one embodiment, when coupled together, there exists less than 2 um placement tolerance for all three directions between the alignment system 200 and the fiber array unit 600.

Figure 9:
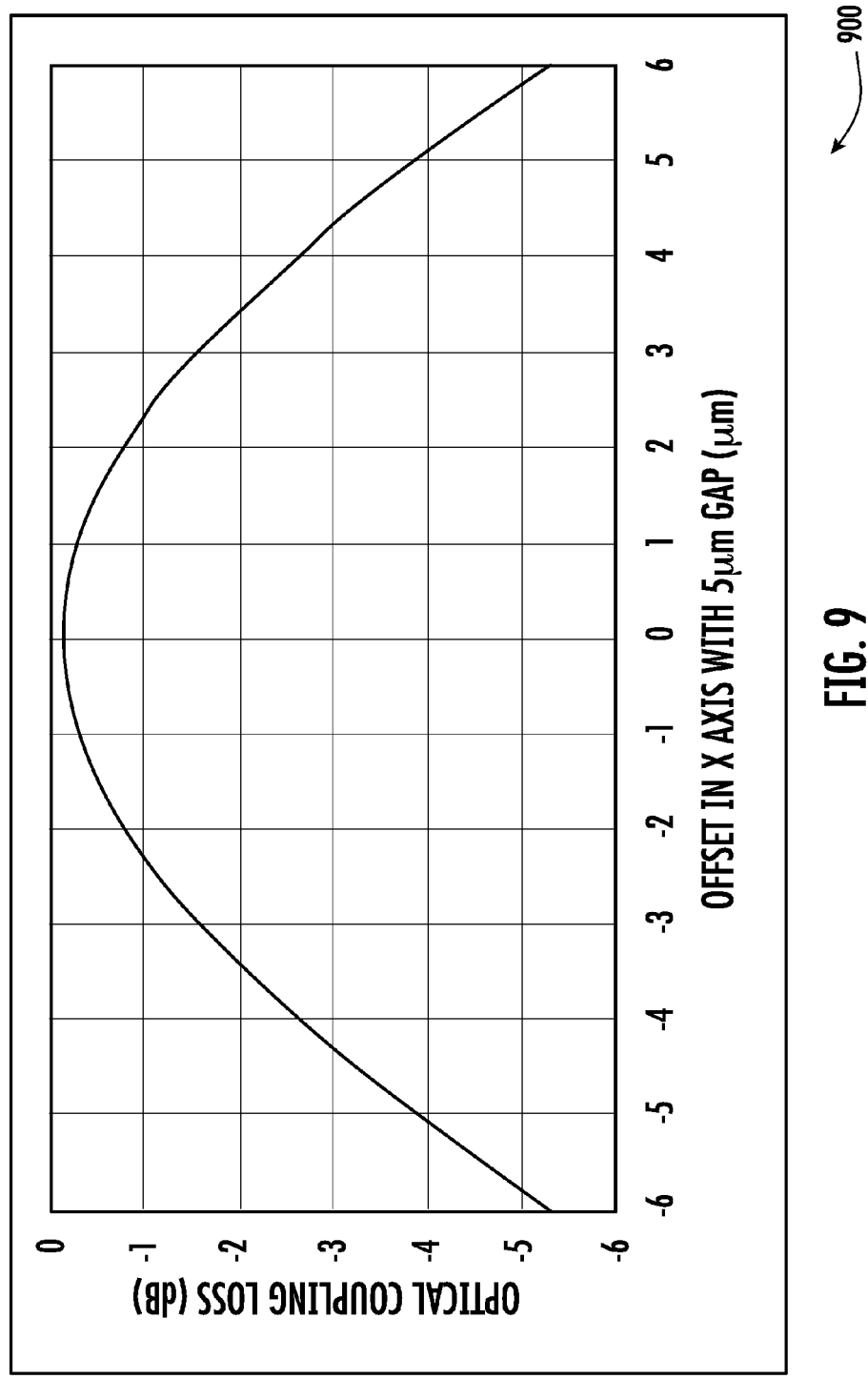
FIG. 9 illustrates simulation results for optically coupling a photonic chip to a fiber array unit, according to one embodiment disclosed herein.

FIG. 9 illustrates simulation results for optically coupling the photonic chip 140 to the optical fibers 505 (i.e., the photonic system 800 in FIG. 8B), according to one embodiment disclosed herein. Chart 900 illustrates the coupling loss of the photonic system 800 when an optical signal is transmitted to, or from, the photonic chip 140 in the transverse electric (TE) mode and the transverse magnetic (TM) mode. As shown, the chart 900 illustrates that as the offset in the X axis increases, the coupling loss increases.

Figure 10:
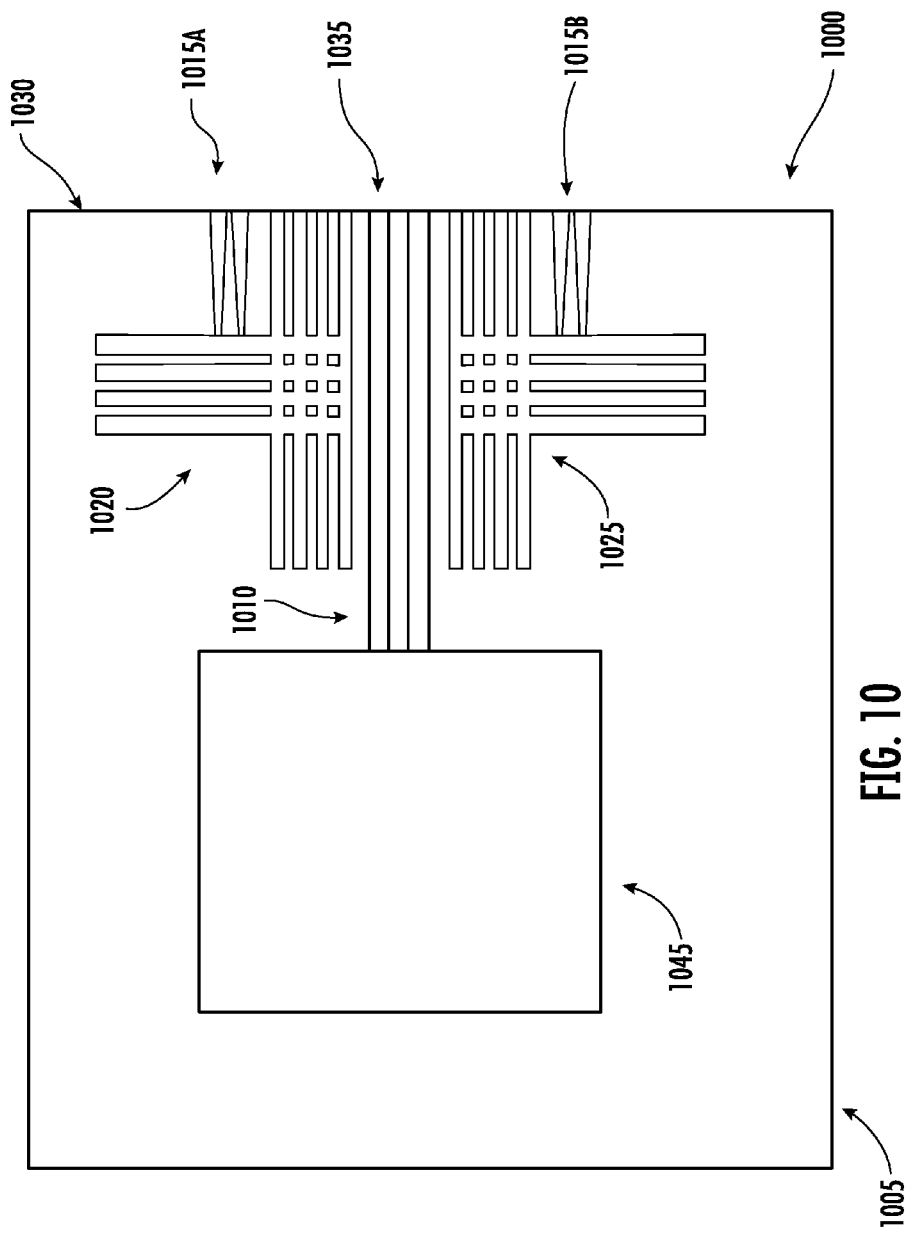
FIGS. 10-11 illustrate an alignment system and a fiber array unit, according to one embodiment disclosed herein.

FIG. 10 illustrates an alignment system 1000 having a photonic chip 1005, according to one embodiment herein. As shown, the alignment system 1000 has a photonic chip 1005, driver 1045 on top of the photonic chip 1005, WGs 1010, alignment slots 1015A and 1015B, epoxy channels 1020 and 1025, and an optical interface 1035. As shown, the alignment slots 1015A and 1015B are etched within the photonic chip 1005 approximate to the epoxy channels 1020 and 1025. The epoxy channels 1020 and 1025 allow epoxy to flow to attach the FAU to the photonic chip 140. In one embodiment, the epoxy channels 1020 and 1025 have dimensions designed to optimize the epoxy application and flow during the mating process.

The WGs 1010 extend from the photonic chip 140 to the optical interface 1035 at the edge 1030 of the photonic chip 1005. Thus, in contrast to the alignment system 200 in FIG. 2 where the WGs 210 optically couple the photonic chip 140 with a respective optical interface 235 of each of the alignment slots 215, the optical interface 1035 is not associated with the alignment slots 1015A and 1015B. While the WGs 1010 are shown as extending to the edge 1030 of the photonic chip 1005, the WGs 1010 may not be directly exposed at the optical interface 1035. Rather, in one embodiment, the WGs 1010 are optically connected with the optical interfaces 1035, but the WGs 1010 are recessed from the edge 1030 of the photonic chip 1005. That is, the WGs 1010 terminate before reaching the edge topical interface 1035. In that case, dielectric material is present between the termination of WGs 101 and the optical interface 1035.

Figure 11:
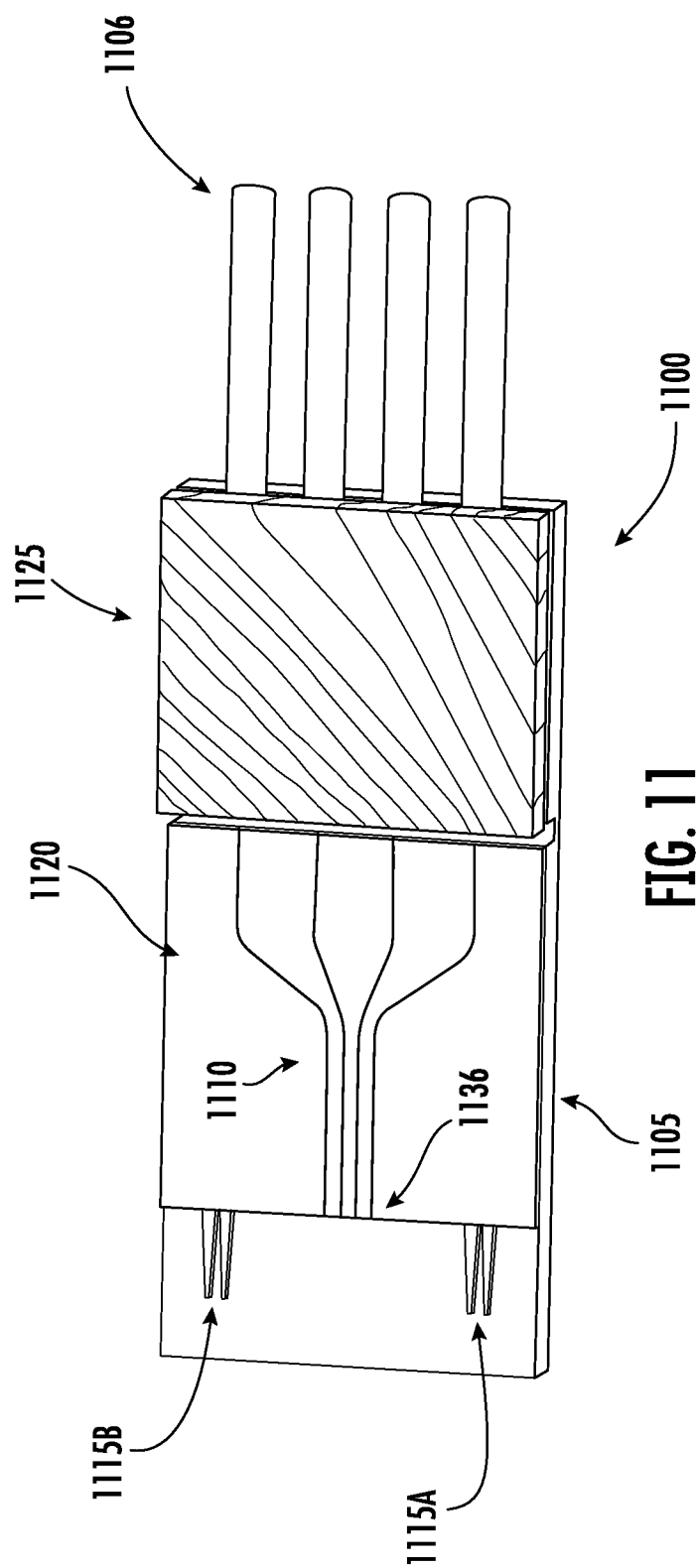

FIG. 11 illustrates a FAU 1100, according to one embodiment herein. The FAU 1100 has a substrate 1105 having four grooves (not shown) for receiving optical fibers 1106, as well as a fiber holding plate 1125 prevents the optical fibers 1106 from shifting. The FAU 1100 has a cladding 1120 having a plurality of WGs 1110 formed in the cladding 1120. In one embodiment, the cladding 1120 is placed on top of the substrate 1105. In another embodiment, the cladding 1120 is a portion of the substrate 1105.

As shown, the FAU 1100 has a plurality of alignment teeth 1115A and 1115B. In one embodiment, the alignment teeth 1115 are etched out of the cladding 1120 to reveal a top surface of the substrate 1105. The alignment teeth 1115 correlate to the alignment slots 1015A and 1015B of FIG. 10. That is, in one embodiment the alignment teeth 1115A and 1115B have approximately the same height, width, and depth as the alignment slots 1015A and 1015B. Thus, when the alignment teeth 1115A and 1115B are mated with the alignment slots 1015A and 1015B, the alignment teeth 1115A and 1115B fit within the alignment slots 1015A and 1015B.

The FAU 1100 has four WGs 1110. In contrast to the FAU 400 of FIG. 4 where a respective WG 410 is associated with each of the alignment teeth 415, the WGs 1110 are not associated with the alignment teeth 1115A and 11156. That is, as shown, the WGs 1110 begin at an optical interface 1136, which is not associated with the alignment teeth 1115A and 11156, and terminate at the optical fibers 1106. Thus, the WGs 1110 create an optical link between the interface 1136 and the optical fibers 1106. Therefore, when the FAU 1100 is mated with the alignment system 1000, a continuous optical connection is created between the photonic chip 140 and the optical fibers 1106. While two separate embodiments regarding the location of the WGs 410 are illustrated for ease of explanation, a person skilled in the art would appreciate that some of the WGs may be associated with the alignment teeth, whereas in the same embodiment some of the WGs may not be associated with the alignment teeth.

Figure 12:
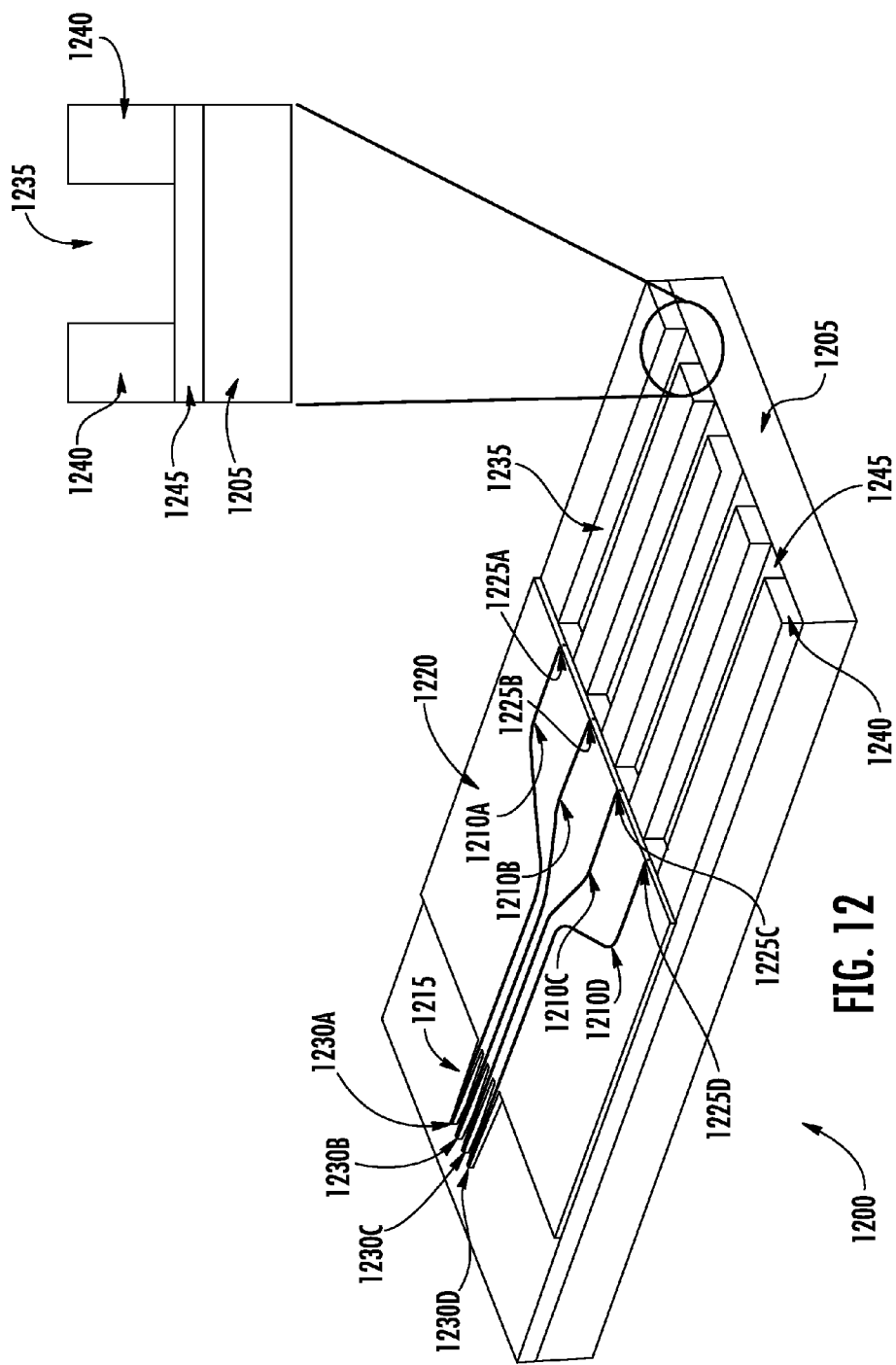
FIG. 12 illustrates an alignment system, according to one embodiment disclosed herein.

FIG. 12 illustrates a FAU 1200, according to one embodiment herein. The FAU 1200 has a substrate 1205 having four grooves 1235 for holding optical fibers (not shown). While not shown, a person skilled in the art would appreciate a fiber termination slot may be added to the FAU 1200 which dictates where the optical fibers terminate when placed in the grooves 430. In one embodiment, the FAU 1200 is made of an SOI substrate with a very precise SOI layer thickness, and has a cladding 1220 with a plurality of WGs 1210 formed therein. In one embodiment, the cladding 1220 is a dielectric material placed on top of the substrate 1205. In another embodiment, the cladding 1220 is a silicon dioxide ($SiO_2$). The WGs 1210 may be Germanium doped silicon dioxide (Ge—SiO2), silicon nitride, or any other higher index material with respect to the cladding.

As shown, the FAU 1200 has a plurality of alignment teeth 1215 etched out of the cladding 1220. The alignment teeth 1215 correlate to the alignment slots 215 of FIG. 3B. That is, in one embodiment the alignment teeth 1215 have approximately the same (or slightly smaller) height, width, and depth as the alignment slots 215. Thus, when the alignment teeth 1215 are mated with the alignment slots 215, the alignment teeth 1215 fit within the volume defined by the alignment slots 215. The FAU 1200 is the same as FAU 400 of FIG. 4, except that the grooves 1230 have a primarily U shape to receive an optical fiber. Thus, the description with reference to FAU 400 is equally applicable FAU 1200, and the similarities will not be discussed in depth.

The FAU 1200 has four grooves 1235. As shown, the grooves 1230 have a primarily U shape to receive an optical fiber. In one embodiment, the dimensions of the grooves 1235 are dictated by the size of the optical fiber. For example, the grooves 1235 may have a height and depth such that when an optical fiber is placed within the groove, the center of the optical fiber is optically aligned with the four WGs 1210 at the optical interfaces 1225A, 1125B, 1225C, and 1225D. While the FAU 1200 is illustrated with four groves 1235 for simplicity, a person skilled in the art would appreciate the FAU 1200 may have any number of groves 430 (e.g., 1, 10, 50, 1000, etc.) and waveguides.

In one embodiment, the grooves 1235 are etched in an SOI layer 1240 using Deep Reactive Ion Etching (DRIE). As shown, a buried oxide layer 1245 on top of the substrate 1205 acts as an etch stop layer. That is, the grooves 1235 are etched through the SOI Layer 1240 down to the buried oxide layer 1245, and the buried oxide layer 1245 act as the etch stop to allow for very precise depth control. In one embodiment, the thickness of the SOI layer 1240 and the width of the grooves 1235 are selected in a manner such that when a fiber (not shown) is placed in the grooves 1235, the core of the fiber is aligned with the core of the a respective waveguide 1210. In one embodiment, the substrate 1205 is a silicon substrate.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In view of the foregoing, the scope of the present disclosure is determined by the claims that follow.

We claim:

1. A system, comprising:
   a photonic chip, comprising:
      a first plurality of waveguides in the photonic chip having respective first ends optically coupled with an optical component of the photonic chip and respective second ends optically coupled with a first plurality of optical interfaces in the photonic chip, and
      a first plurality of alignment features; and
   a Fiber Array Unit (FAU) mated with the photonic chip, comprising:
      a second plurality of waveguides having respective first ends optically coupled with a second plurality of optical interfaces in the FAU such that the second ends of the first plurality of waveguides are optically coupled with the first ends of the second plurality of waveguides, and wherein the second plurality of waveguides have respective second ends optically coupled with a third plurality of optical interfaces in the FAU, a second plurality of alignment features mated with the first plurality of alignment features to align the first ends of the first plurality of waveguides with the second plurality of waveguides, wherein one of the first plurality of alignment features and the second plurality of alignment features is a plurality of slots and the other is a plurality of teeth, wherein the plurality of teeth have dimensions that correspond to the plurality of slots, and a plurality of optical fibers disposed within a plurality of grooves, wherein the plurality of grooves align the plurality of optical fibers to the third plurality of optical interfaces and the second ends of the second plurality of waveguides.

2. The system according to claim 1, wherein the second plurality of optical interfaces is positioned at the end of the plurality of teeth such that each of the second plurality of waveguides corresponds to a respective one of the teeth and extends through the respective teeth.

3. The system according to claim 2, wherein the second plurality of optical interfaces is passively aligned with a fourth plurality of optical interfaces in the plurality of slots.

4. The system according to claim 1, wherein the first ends of the second plurality of waveguides are spaced a first distance apart and the second ends of the second plurality of waveguides are spaced a second distance apart, wherein the second distance is greater than the first distance.

5. The system according to claim 1, wherein:
the plurality of teeth each comprises a first length, a first width, and a height;
the plurality of slots each comprises a second length, a second width, and a depth;
the first and second widths are approximately the same;
the first and second lengths are approximately the same; and
the height of the plurality of teeth correspond to the depth of the plurality of slots.

6. The system according to claim 1, wherein the photonic chip further comprises a plurality of channels having an epoxy for binding the FAU with the photonic chip.

7. A Fiber Array Unit (FAU) for providing optical coupling between a photonic chip and a plurality of optical fibers, the FAU comprising:
a first plurality of waveguides configured to at least one of transmit and receive an optical signal, wherein the first plurality of waveguides have respective first ends optically coupled with a first plurality of optical interfaces and respective second ends optically coupled with a second plurality of optical interfaces;
a plurality of grooves configured to receive and align the plurality of optical fibers to the first plurality of optical interfaces and the first ends of the first plurality of waveguides; and
a first plurality of alignment features corresponding to a second plurality of alignment features disposed in an external substrate, wherein the first plurality of alignment features and the second plurality of alignment features are arranged such that when mated the seconds ends of the first plurality of waveguides are passively aligned to a second plurality of waveguides in the external substrate,
wherein the first plurality of alignment features is a plurality of alignment teeth, and wherein the second plurality of optical interfaces is positioned at the end of the plurality of alignment teeth such that each of the first plurality of waveguides corresponds to a respective one of the plurality of alignment teeth and extend through the respective alignment teeth.

8. The FAU according to claim 7, wherein the second plurality of optical interfaces is passively aligned with a third plurality of optical interfaces in the external substrate when the plurality of alignment teeth is mated with a plurality of alignment slots.

9. The FAU according to claim 7, wherein the second plurality of optical interfaces is positioned at an edge of the FAU at a first location and the plurality of alignment teeth is at a second different location.

10. The FAU according to claim 7, wherein the first ends of the first plurality of waveguides are spaced a first distance apart and the second ends of the first plurality of waveguides are spaced a second distance apart, wherein the second distance is greater than the first distance.

11. The FAU according to claim 7, wherein:
the plurality of alignment teeth each comprising a first length, a first width, and a height;
the second plurality of alignment features is a plurality of alignment slots that each comprise a second length, a second width, and a depth;
the first and second widths are approximately the same;
the first and second lengths are approximately the same; and
the height of the plurality of alignment teeth correspond to the depth of the plurality of alignment slots.

12. The FAU according to claim 7, wherein the external substrate comprises a plurality of channels configured to receive an epoxy for binding the FAU with the photonic chip.

13. A photonic chip, the photonic chip comprising:
a first plurality of waveguides in the photonic chip having respective first ends optically coupled with an optical component of the photonic chip and respective second ends optically coupled with a first plurality of optical interfaces in the photonic chip, and
a first plurality of alignment features disposed in a substrate, wherein the first plurality of alignment features is configured to mate with a Fiber Array Unit (FAU), wherein the FAU comprises:
a second plurality of waveguides having respective first ends optically coupled with a second plurality of optical interfaces in the FAU such that the second ends of the first plurality of waveguides are optically coupled with the first ends of the second plurality of waveguides, and wherein the second plurality of waveguides have respective second ends optically coupled with a third plurality of optical interfaces in the FAU,
a second plurality of alignment features mated with the first plurality of alignment features to align the first ends of the first plurality of waveguides with the second plurality of waveguides, wherein the first plurality of alignment features is a plurality of slots, wherein the second plurality of alignment features is a plurality of alignment teeth, wherein the second plurality of optical interfaces is positioned at the end of the plurality of alignment teeth such that each of the second plurality of waveguides corresponds to a respective one of the plurality of alignment teeth and extend through each of the respective alignment teeth, and
a plurality of optical fibers disposed within a plurality of grooves, wherein the plurality of grooves align the plurality of optical fibers to the third plurality of optical interfaces and the second ends of the second plurality of waveguides.

14. The photonic chip according to claim 13, wherein the second plurality of optical interfaces is passively aligned with a fourth plurality of optical interfaces in the plurality of slots.

15. The photonic chip according to claim 13, wherein the second plurality of optical interfaces is positioned at an edge of the FAU at a first location and the plurality of alignment teeth is at a second different location.

16. The photonic chip according to claim 13, wherein the first ends of the second plurality of waveguides are spaced a first distance apart and the second ends of the second plurality of waveguides are spaced a second distance apart, wherein the second distance is greater than the first distance.

17. The photonic chip according to claim 13, wherein:
the plurality of alignment teeth each comprises a first length, a first width, and a height;
the plurality of slots each comprises a second length, a second width, and a depth;
the first and second widths are approximately the same;
the first and second lengths are approximately the same; and
the height of the plurality of alignment teeth correspond to the depth of the plurality of alignment slots.

* * * * *